(12) United States Patent
Norton, Jr. et al.

(10) Patent No.: US 12,706,004 B2
(45) Date of Patent: Aug. 11, 2026

(54) PACKAGE SECURITY UTILIZING TAMPER-RESISTANT TAPE

(71) Applicant: Lenovo Global Technology (United States) Inc., Morrisville, NC (US)

(72) Inventors: Robert James Norton, Jr., Raleigh, NC (US); Robert J. Kapinos, Durham, NC (US); Igor Stolbikov, Apex, NC (US); Scott Li, Cary, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 0 days.

(21) Appl. No.: 19/042,739

(22) Filed: Jan. 31, 2025

(65) Prior Publication Data

US 2026/0229151 A1 Aug. 6, 2026

(51) Int. Cl.
*G09F 3/00* (2006.01)
*B65D 5/02* (2006.01)
*B65D 5/42* (2006.01)
*G06K 7/14* (2006.01)

(52) U.S. Cl.
CPC ......... *G09F 3/0297* (2013.01); *B65D 5/0236* (2013.01); *B65D 5/4233* (2013.01); *G06K 7/1404* (2013.01)

(58) Field of Classification Search
CPC .... G09F 3/0297; B65D 5/0236; B65D 5/4233
USPC .......................................................... 235/454
See application file for complete search history.

(56) References Cited

U.S. PATENT DOCUMENTS 5,507,429 A * 4/1996 Arlin ...................... B65D 55/06 53/399
5,541,577 A * 7/1996 Cooper ............. G08B 13/2408 116/4
5,620,087 A * 4/1997 Martin .................. B65B 25/008 206/820
6,447,015 B1 * 9/2002 Linnewiel ............... B32B 27/08 428/34.3
11,296,897 B2 * 4/2022 Endress .............. H04L 67/1042
12,197,625 B1 * 1/2025 Stafford .................. G06F 21/16
12,406,015 B2 * 9/2025 Brown .................. G06F 16/951
(Continued)

OTHER PUBLICATIONS

"Non-Residue Tamper Evident Labels", Intab LLC, Accessed on Dec. 20, 2024, 2 pages, Copy available at: https://www.intab.net/Barcode-1-3_16x4-5_16-Non-Residue-Tamper-Evident-Labels/productinfo/03-1375/.

*Primary Examiner* — Allyson N Trail
(74) *Attorney, Agent, or Firm* — FERENCE & ASSOCIATES LLC

(57) ABSTRACT

One embodiment provides a method, the method including: receiving, at a tamper detection system, a machine-readable capture of tape located on a package, wherein the tape includes at least two blocks of machine-recognizable characters generated utilizing at least one cryptographic technique, wherein the at least one cryptographic technique is used to generate a non-repeating signature having a length greater than a length of the tape; comparing, using the tamper detection system, the at least one block of machine-recognizable characters captured during the machine-readable capture of the tape on the package the non-repeating signature; and performing, using the tamper detection system, an action based upon a result of the comparing. Other aspects are claimed and described.

20 Claims, 4 Drawing Sheets

(56) References Cited

U.S. PATENT DOCUMENTS

| | | | | |
|---|---|---|---|---|
| 2003/0083890 | A1* | 5/2003 | Duncan | G06Q 10/087<br>705/28 |
| 2004/0264813 | A1* | 12/2004 | Steffens | B65D 33/34<br>383/93 |
| 2007/0071968 | A1* | 3/2007 | Hermony | C09J 7/29<br>428/354 |
| 2009/0233035 | A1* | 9/2009 | Wang | G09F 3/0341<br>428/42.3 |
| 2015/0287853 | A1* | 10/2015 | Hamada | C23C 14/5866<br>252/582 |
| 2017/0345013 | A1* | 11/2017 | Datta | G06Q 30/012 |
| 2019/0225395 | A1* | 7/2019 | Anand | B65D 51/20 |
| 2021/0248338 | A1* | 8/2021 | Spivack | G06K 7/10831 |
| 2021/0295247 | A1* | 9/2021 | Volkerink | H04W 4/029 |
| 2024/0013603 | A1* | 1/2024 | Glinert | B65D 73/0085 |
| 2025/0009920 | A1* | 1/2025 | Patel | G01N 31/226 |
| 2025/0045538 | A1* | 2/2025 | Butler | G06K 1/121 |

* cited by examiner

PACKAGE SECURITY UTILIZING TAMPER-RESISTANT TAPE

BACKGROUND

Packages are shipped all over the world, with millions of packages being transported each day. Additionally, millions of packages may be sitting at different origin or destination locations within the supply chain. Some of these packages may have value to actors other than the shipper and the receiver. For example, some packages may have products that have a high resale value, that are frequently counterfeited, and/or the like. Thus, some actors may attempt to steal packages or even open the packages and remove the products from the packages. In the event that the actors remove the products from the packages, the actors may attempt to reseal the package so that it is not easily identified that the package has been tampered with. Additionally, the actor may even go so far as to put a different product in the package to make it even more difficult to identify the tampering. For example, the actor may take the authentic product and replace it with a counterfeit version of the product. In order to make the chances of profit higher, an actor may target packages from specific shippers, manufacturers, and/or the like, knowing the typical products that are found in such packages have a value to the actor.

BRIEF SUMMARY

In summary, one aspect provides a method, the method including: receiving, at a tamper detection system, a machine-readable capture of tape located on a package, wherein the tape includes at least two blocks of machine-recognizable characters generated utilizing at least one cryptographic technique, wherein the at least one cryptographic technique is used to generate a non-repeating signature having a length greater than a length of the tape; comparing, using the tamper detection system, the at least one block of machine-recognizable characters captured during the machine-readable capture of the tape on the package the non-repeating signature; and performing, using the tamper detection system, an action based upon a result of the comparing.

Another aspect provides a system, the system including: a processor; a memory device that stores instructions that, when executed by the processor, causes the system to: receive, at a tamper detection system, a machine-readable capture of tape located on a package, wherein the tape includes at least two blocks of machine-recognizable characters generated utilizing at least one cryptographic technique, wherein the at least one cryptographic technique is used to generate a non-repeating signature having a length greater than a length of the tape; compare, using the tamper detection system, the at least one block of machine-recognizable characters captured during the machine-readable capture of the tape on the package the non-repeating signature; and perform, using the tamper detection system, an action based upon a result of the comparing.

A further aspect provides a product, the product including: a computer-readable storage device that stores executable code that, when executed by a processor, causes the product to: receive, at a tamper detection system, a machine-readable capture of tape located on a package, wherein the tape includes at least two blocks of machine-recognizable characters generated utilizing at least one cryptographic technique, wherein the at least one cryptographic technique is used to generate a non-repeating signature having a length greater than a length of the tape; compare, using the tamper detection system, the at least one block of machine-recognizable characters captured during the machine-readable capture of the tape on the package the non-repeating signature; and perform, using the tamper detection system, an action based upon a result of the comparing.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
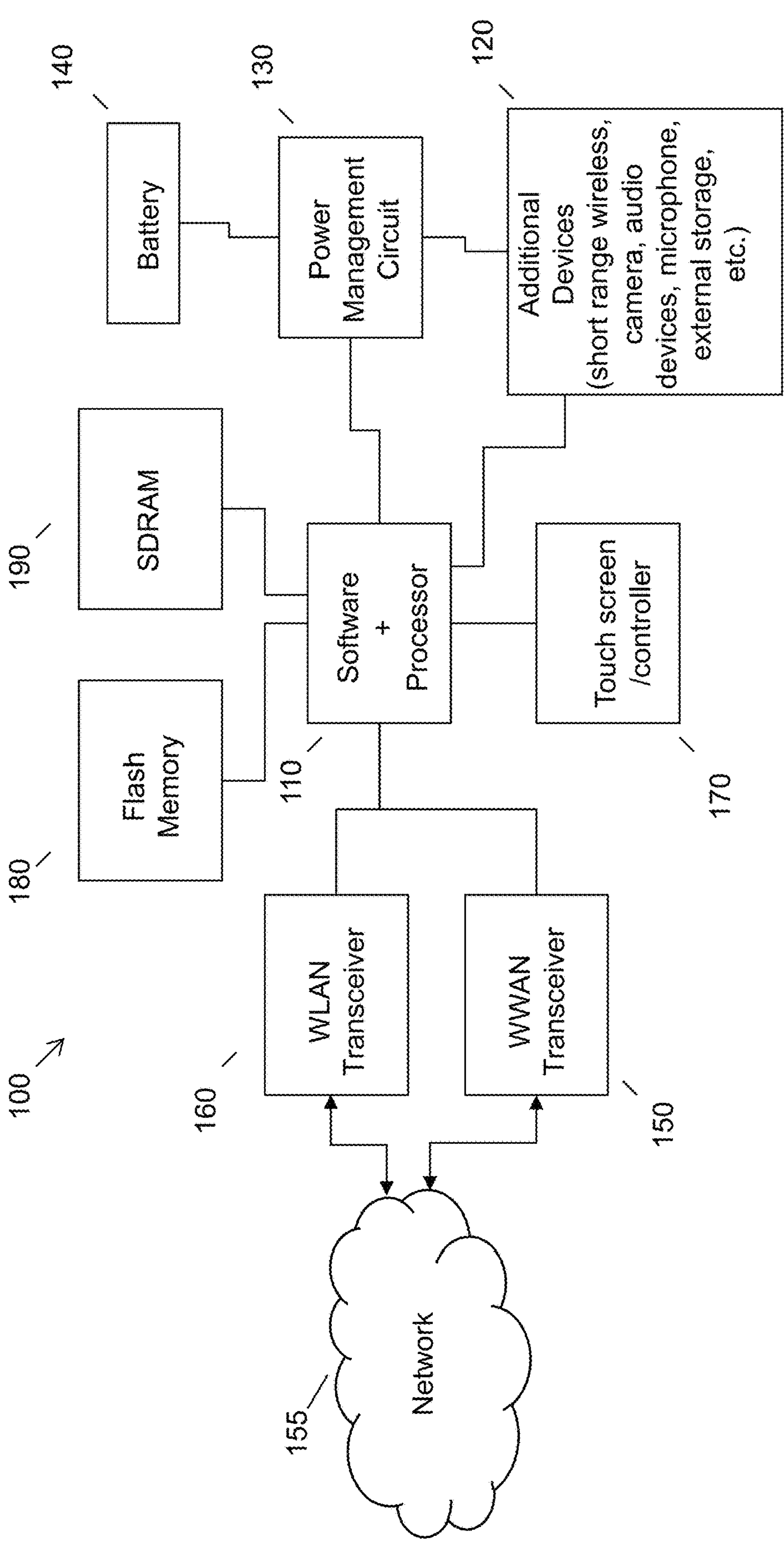
FIG. 1 illustrates an example of information handling device circuitry.

Many companies and entities lose significant amounts of money due to package tampering that occurs in the supply chain, either the transportation portion of the supply chain or the storage portion of the supply chain. The companies may not only lose money related to the actual theft of the product, but may also lose money if the theft is not detected until the product is needed or used. If the expected product is not available when needed, the company has to quickly get the needed product to the correct location, which has additional cost in expedited shipping and a cost in resources obtaining the needed product. If the product is used before it is identified as not the expected product, damage to devices where the product is installed may occur, frustration may occur if the product does not work or fit like the expected product, and the company may lose goodwill over the fraudulent product. Thus, preventing actors from tampering with packages or at least detecting package tampering is of great importance to companies and other entities. Additionally, ensuring that products that are received or utilized are authentic products and are the expected product is also of great importance to companies and other entities.

One traditional technique for detecting tampering with a package has been through the use of tamper-detection tape that can be used to secure the package closures. Tamper-detection tape can include different anti-tamper mechanisms that assist in identifying if the tape securing a package has been removed, damaged, or otherwise manipulated. One such anti-removal mechanism includes tape that has multiple layers. When the tape is removed, one layer stays on the package where the tape was located. In other words, when the tape is removed, the layers separate leaving a residue or mark on the package to indicate where the tape was located. This allows a person to easily see that the tape was removed and it is very difficult to re-stick the tape such that the layers match. When the new piece of tape is removed, it would also leave a residue which would be difficult to distinguish from the residue of the original piece of tape. However, bad actors can easily source common anti-tamper tape and use it to reseal boxes after removing or altering the contents.

Another anti-tamper mechanism includes tape that has a design or words that are specifically positioned on the tape. The design or words are usually specific to the identity of the boxer. When the tape is removed or cut, the design or words are damaged such that the removal or cutting of the tape is obvious. Replacement of this specific tape with generic tape is an indicator of tampering. However, bad actors could copy the tape design and make a new piece of tape to reseal the box. Additionally, even if the tamper is evident using one of the anti-tamper mechanisms, the bad actor could put the swapped product in a new package and seal the new package with tape that has similar designs or words to the tape that was used to seal the package. Thus, such anti-tamper mechanisms do not prevent bad actors from gaining access to the products and making the package appear that it was not tampered with. In other words, such anti-tamper mechanisms are subject to copying attacks.

The standard technique for defeating tape copy attacks is to add difficult-to-copy elements such as holograms or embosses to the tape. These elements coexist with the anti-removal, anti-reuse, and source indication measures to prevent removal and replacement. These elements are effective to prevent bad actors who are not well equipped from altering boxes in an undetectable manner. They fail when bad actors steal tape at the manufacturing source or have resources to produce high-quality replicas of anti-tamper tape.

Traditional techniques for detecting the authenticity of a product or component rely on ensuring the ability to track the chain of custody of a product. If the company or entity can follow the product or package through the supply chain until it reaches the end user, the company or entity can be ensured that the product or package that the company supplied is the authentic and correct product. However, tracking products and packaging through the supply chain and ensuring no ability for a bad actor to tamper with or swap the product or package is an extremely difficult task. Unless the company or entity has its own supply chain that is completely controlled by the company or entity, the company is at the mercy of other companies or entities, which may or may not be able to completely control the supply chain. Additionally, even if the company has its own supply chain, it can be difficult to ensure that no bad actors have access to products or packages that may make their way into the hands of consumer or end users.

Some products come with a certificate of authenticity, but these may only be included in the product package which means the product can be replaced with a counterfeit or swapped product. Additionally, even if the certificate of authenticity, holographic label, or other company-unique marker is attached to the product, such company-unique markers may be well known and may, therefore, be easily copied and placed on the counterfeit or swapped product. Thus, while helpful, such techniques do not ensure that bad actors cannot circumvent the validation of the authenticity of a product. In other words, using these traditional techniques, bad actors who want to obtain the product can relatively easily also copy or fake authenticity documents for a swapped product.

Accordingly, the described system and method provides a system for validating a package for tamper detection utilizing tape having machine-recognizable characters generated using at least one cryptographic technique. This cryptographic technique is chosen so that any sequential sequence of characters exists in an infinite non-repeating sequence; that such sequence can be generated only by the tape creator; and that a scanned sigil sequence can be validated quickly as being a member of the infinite sequence. The tamper detection system receives a machine-readable capture of tape that is located on a package. The system can validate that the characters detected in the capture are members of a legitimate sequential sequence and thus were issued by the package provider. The system can compare the machine-readable capture to a previously captured machine-readable capture of the package to ensure chain of custody. The tape may be securing the package or may be located on the product to ensure the authenticity of the package. Thus, the package may be a shipping container or box that a product or component is shipped or transported within or may a product or component itself. To be valid, the tape includes at least two blocks of machine-recognizable characters (e.g., numbers, letters, symbols, punctuation, emojis, etc.) that form part of the aforementioned infinite sequence and that are the same as the initial capture of the tape at the point of packaging.

The blocks of characters are generated using at least one cryptographic technique that is used to a generate a signature having a predetermined length and the includes the block of characters. In other words, the cryptographic technique is used to generate an infinitely long, or however long is desired, string of blocks of machine-recognizable characters. This string of blocks is referred to as the signature. The length of the signature spans an entire roll or other distributed unit of the tape. Other tape units may use other parts of the same signature, or different signatures generated using the same cryptographic algorithm. Thus, each block sequence on the tape is unique from the other block sequences on the tape and on other tapes, thereby meaning that each segment of tape that may be placed on a package is unique from each other segment of tape. A very short length of tape is sufficient for checking if each machine-readable block contains a sufficient number of bits of data. Relatively small character sequence lengths, for example, four Unicode characters per block, can provide enough distinct sequences for a single tape unit. Additionally, since the blocks are generated using a cryptographic technique, the tenants or properties of the cryptographic technique that is used are inherited by the tape. For example, if the cryptographic technique provides that each block of characters cannot be guessed from a previous string or block of characters, this means that a block of characters on one portion of the tape cannot be guessed from a different block of characters on a different portion of the tape.

Once the machine-readable capture of the tape is received, the tamper detection system can compare the information contained within the capture to information contained within a previously captured machine-readable capture of the package. In other words, the system can compare the blocks of machine-recognizable characters on the package as of the capture with blocks of machine-recognizable characters that were on the package during a previous capture. If the package was resealed with a different tape piece, the signature will not be the same and will not match the stored ones.

Thus, the system can perform an action based upon the result of the comparison. In the event that the information contained within the captures match, the system could validate the physical security of the package or the authenticity of the package. In the event that the information contained within the captures do not match, the system could notify a user of the mismatch and the user could take necessary action.

In addition to comparing the original tape captures to the received tape, the tamper detection system can use an algorithm to validate that the sequence of characters on both tape captures was generated by the correct originator. Since the tape inherits the properties of global uniqueness and reproducibility from the original signature sequence, a cryptological validation method can be embedded into the system to check captures. This check can use any sufficiently powerful asymmetric cryptography to prevent exposure of the entire character sequence to the public. The cryptography may be embedded into the sequence generating algorithm or applied in a separate step. For example, a tape manufacturer might use a company's private key to create a hash to seed a random number algorithm and use a public key in the validation step. For another example, a tape manufacturer might generate only one infinite sequence, and encrypt different segments of it for different companies' tape using each companies' private key. As a final, non-limiting, example, the check might be done using a homomorphic encryption validator so that the original generated sequence is never exposed to anyone. Thus, an attacker who has wholly substituted the package at its origin can also be detected and some action taken. For example, if an attacker had stolen some tape to make false boxes, that tape section can be tracked by its signature to its loss point and all lost character sequences globally invalidated in the system.

Therefore, a system provides a technical improvement over traditional methods for validating package security. The described system and method include unique tape that has blocks of machine-readable characters that are generated in such a way that they are unique and cannot be forged. In other words, the machine-readable characters are generated using cryptographic techniques that fulfill cryptographic tenets for security. Thus, the tape is secured by these same tenets, making it all but impossible to copy and ensures a technique for detecting package tampering or package swapping. Unlike traditional techniques which can be copied and then placed on a package, the described tape is immune to such copying. Thus, any package tampering that damages or manipulates the tape can be detected. Additionally, any products that are marked with the tape can be guaranteed of authenticity due to the inability to fake the tape. Accordingly, the described system and method provides a technique for detecting package tampering and package swapping with an accuracy that is not possible with current techniques.

The described anti-tamper system can use any ordinary printing mechanism or any fancy mechanism for placing the signature onto the tape. It is not constrained by the format of the information blocks that proceed down the tape, the block size, or the block position relative to the tape width. This makes the system compatible with self-destructible tape, glue residue tamper proofing methods, holograms, embosses, logos, and other well established anti-tamper mechanisms. The described system is expected to be used in conjunction with other measures to provide more robust solutions.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks 155 (e.g., telecommunications networks, wireless Internet devices (e.g., access points), cloud networks, remote networks, local networks, etc.). Additionally, devices 120 are commonly included, e.g., a wireless communication device, external storage, camera, microphone, external storage, etc. System 100 often includes a touch screen 170 for data input and display/rendering. System 100 also typically includes various memory devices, for example flash memory 180 and synchronous dynamic random-access memory (SDRAM) 190.

Figure 2:
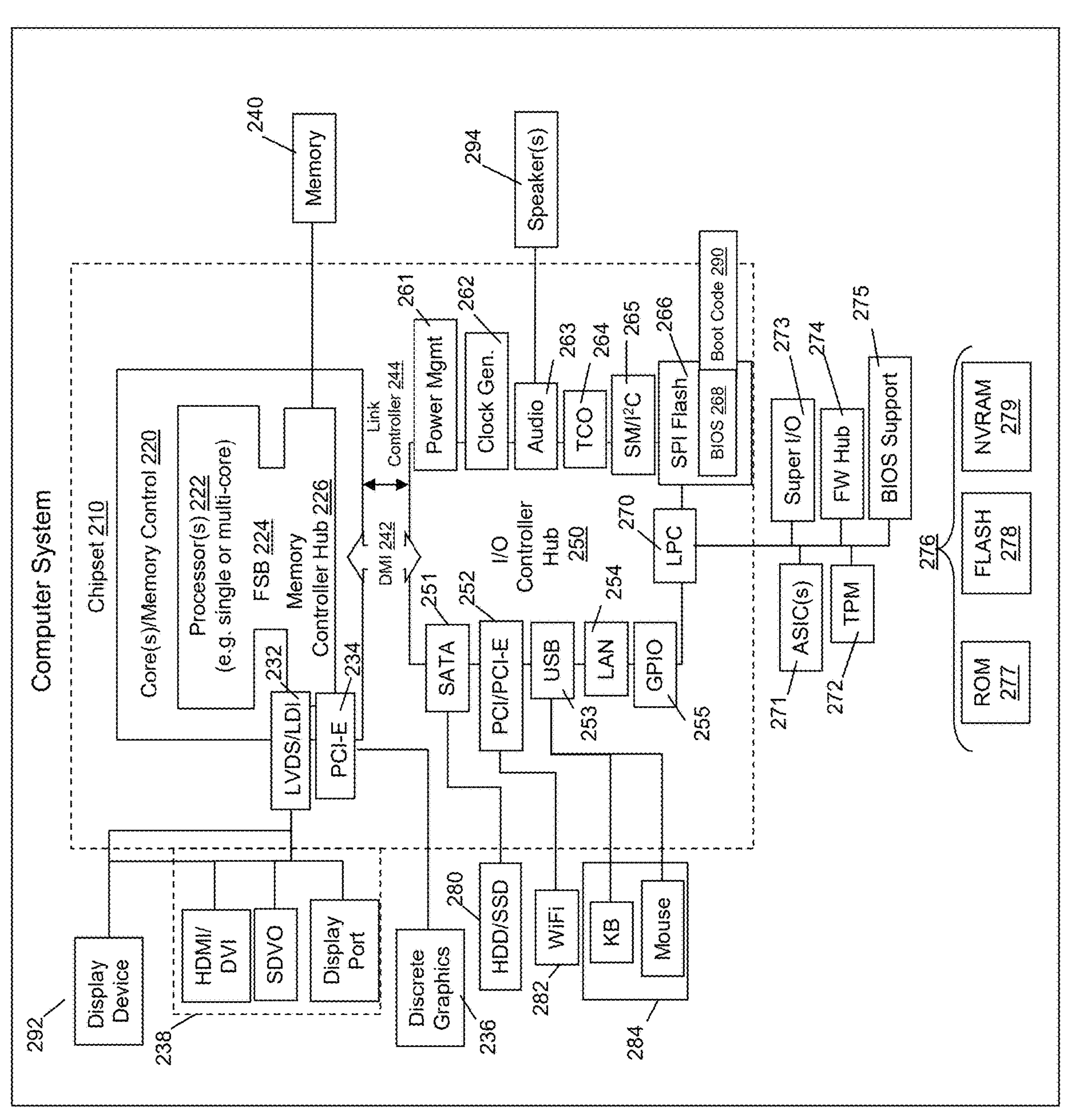
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be devices utilized in the described system and method. For example, the circuitry outlined in FIG. 1 may be implemented in a tablet or smart phone embodiment, whereas the circuitry outlined in FIG. 2 may be implemented in a personal computer embodiment.

Figure 3:
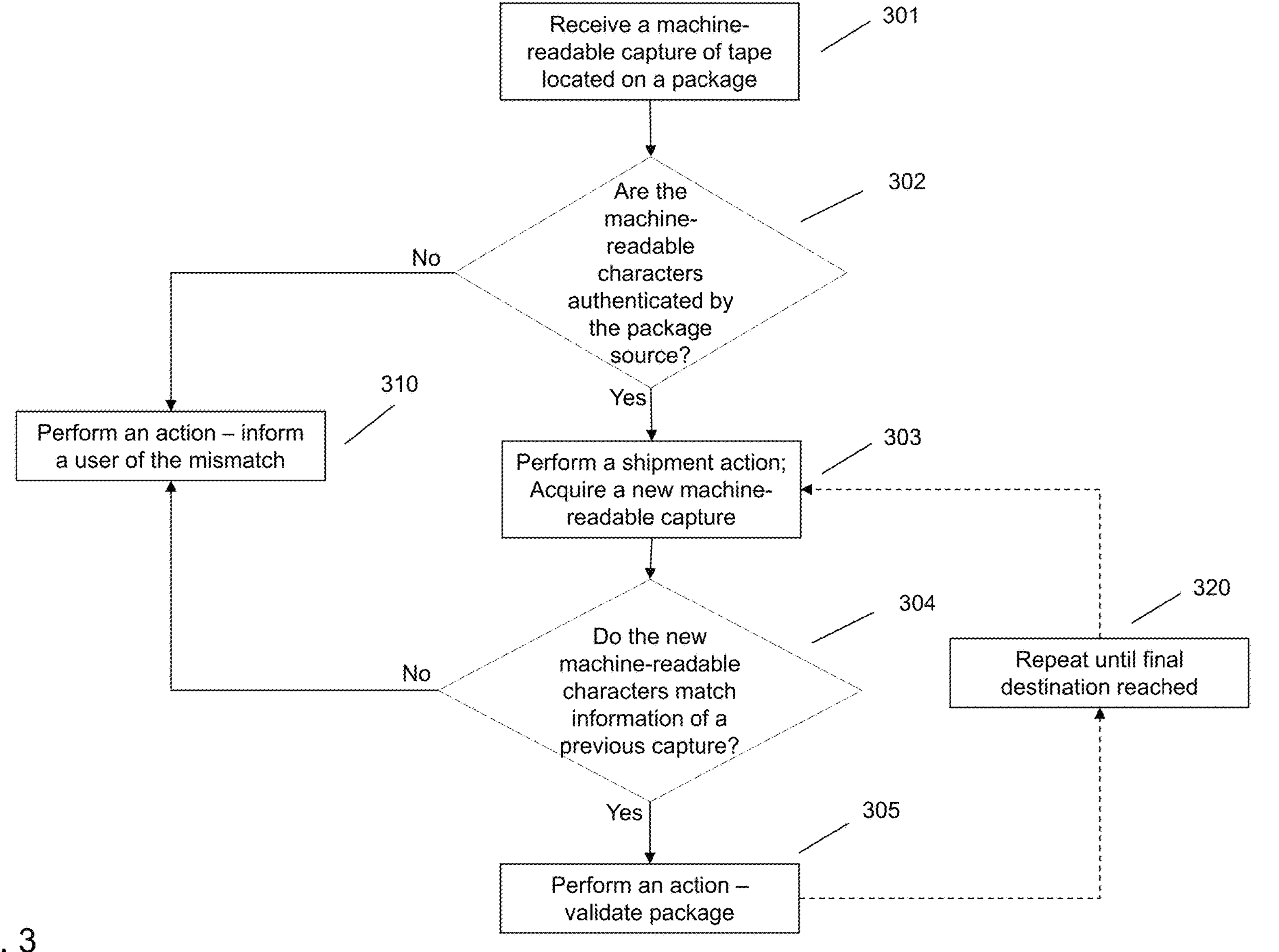
FIG. 3 illustrates an example method for validating a package for tamper detection utilizing tape having machine-recognizable characters generated using at least one cryptographic technique by receiving a machine-readable capture of the tape on the package and comparing the machine-readable capture to a previously captured machine-readable capture of the package.

FIG. 3 illustrates an example method for validating a package for tamper detection utilizing tape having machine-recognizable characters generated using at least one cryptographic technique by receiving a machine-readable capture of the tape on the package and comparing the machine-readable capture to a previously captured machine-readable capture of the package. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to validate the security of a package utilizing unique tape. Additionally, the tamper detection system includes modules and features that are unique to the described system.

The tamper detection system may be activated in order to determine if a package has been tampered with or an authentic product has been swapped with a different product. Thus, the tamper detection system may be activated upon receiving a machine-readable capture of tape located on a package, whether the package is packaging material of a product or a product itself. Additionally, the tamper detection system may be activated to contain and track information related to packages and package captures. As machine-readable captures of a package are received at different points or times within a supply chain, the captures can be stored in a database or other data repository of the tamper detection system for subsequent access and comparisons. After comparing machine-readable captures of a package at different points or times within the supply chain, the tamper detection system can perform an action based upon the result of the comparison.

Activation of the tamper detection system may be a manual activation of the tamper detection system and/or an automatic activation of the tamper detection system. Manual activation of the system may include a user opening an application associated with the tamper detection system, the user accessing the computing system associated with the tamper detection system, and/or the user otherwise providing input to the tamper detection system. The automatic activation of the tamper detection system may be based upon the detection of a trigger event indicating that the system should be activated. Example trigger events include detection of a machine-readable capture of a package, a request for a comparison of machine-readable captures for a package, a user accessing an application that interfaces with the tamper detection system, activation of software or an application utilizing the tamper detection system, and/or the like.

The tamper detection system may be made of multiple systems or modules that communicate together to make up the tamper detection system or may be a single system. The tamper detection system may be a standalone system, may be accessible through other computing devices, and/or a combination thereof. For example, the tamper detection system may be a standalone system that can be accessed by a user and/or may be or provide an application that is accessible by a user on another computing device. The tamper detection system may be accessible using any type of computing device, for example, personal computer, laptop computer, smartphone, tablet, smartwatch, head-mounted display, smart television or other smart appliance, augmented reality device, virtual reality device, and/or the like. Thus, the tamper detection system may be accessible locally using a computing device where the tamper detection system is installed and/or may be accessible remotely through another computing device. For example, the tamper detection system may be accessed by a user using a device that communicates with the tamper detection system to receive or provide a machine-readable capture, compare the information within the capture to previously captured captures, perform actions based upon the result of the comparing, and/or the like. However, the tamper detection system may be located and operate on a different information handling device to perform the described steps.

The detection of whether a package has been tampered with can be provided as a service to other entities or companies. In other words, the tamper detection system could be stored on a server or network of a company and the system could perform comparisons between machine-readable captures to determine if a package has been tampered with or replaced with a different package, with the other companies or entities paying for the generation of the instructions or use of the tamper detection system. Additionally, the creation of the unique tape discussed herein could also be provided as a service to other companies or entities, where a company could create tape using the methods described herein to make the tape is unique to the company or entity requesting the tape.

The tamper detection system may have an associated graphical user interface. The graphical user interface may be provided on a display or monitor, which may or may not be associated with the tamper detection system. In other words, the tamper detection system may have a dedicated display or monitor or may be accessible using any display or monitor. In either case, the tamper detection system may provide instructions to generate and display the graphical user interface on the display device being used to access the tamper detection system. The graphical user interface may also be updated and managed based upon instructions provided by the tamper detection system. In other words, the tamper detection system generates and transmits instructions to create and update the graphical user interface.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may allow a user to provide input identifying information to be used by the tamper detection system. For example, the tamper detection system may utilize a user profile, historical information, and/or the like, to access machine-readable captures of packages, identify actions to be performed based upon comparison results, and/or the like. The graphical user interface may allow for creation of or access to these profiles, historical information, and/or the like, by allowing a user to input information regarding user preferences, and/or the like. As will be discussed in more detail, the use of user provided information is not the only way that the profile and/or historical information can be created. The tamper detection system can then utilize these inputs, whether provided directly by the user or identified using a different technique, to create the profile(s), store the historical information, and/or the like.

A user could also use the graphical user interface to adjust information within the profile(s), historical information, and/or the like. Additionally, or alternatively, the user can input a location of information related to one or more of the profiles, historical information, and/or the like, provide a file corresponding to information related to the information, and/or the like, within the graphical user interface. Input may be provided by the user using any type of input modality, including, but not limited to, mechanical input (e.g., keyboard input, mouse input, etc.), touch input, audible or voice input, gesture input, haptic input, thought input, and/or the like.

The graphical user interface may also provide displays that display information of the profiles, and/or the like. It should be noted that the information to be used by the tamper detection system and information provided by the tamper detection system can be different for different applications, different computing systems, different users, and/or the like. Thus, the information corresponding to input or output of the tamper detection system are not always the same. However, the tamper detection system may have default or system-wide settings that are the same across different users, systems, applications, and/or the like, until the information is adjusted or otherwise changed.

It should be noted that different users may configure the graphical user interface per their preferences. Thus, the graphical user interface layout and configuration may be different between users. How much a user can configure the layout may be restricted or set by a system administrator and/or the like. Additionally, different users or different user roles may have different levels of access, which may also change how and what information is displayed. Thus, different graphical user interfaces may be displayed by the system.

The tamper detection system may utilize one or more artificial intelligence models in determining if a package has been tampered with by comparing machine-readable captures of a package that were captured at different times and/or locations and performing an action based upon the comparison. Artificial intelligence models could be designed to read the machine-readable captures, compare the information in one capture with information of another capture, perform an action based upon the comparison, or any other steps within the described system. Artificial intelligence models may also be used for steps within a step. For example, a model could be utilized to create the machine-recognizable characters on the tape, perform the comparison to make a tamper detection determination, and/or the like.

For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model (e.g., a general model, such as a general classification model) that is fine-tuned for the graphical element modification system, or the artificial intelligence model may be a model that is created and trained from scratch. Since the tamper detection system is used in conjunction with determining if a package has been tampered with, some models that may be utilized by the system are image analysis models, text analysis models, audio analysis models, analysis models, similarity identification models, language models, large language models, entity identification models, input analysis models, filtering models, classification models, and/or the like. The model may be trained using one or more training datasets.

Additionally, as the model is deployed, it may receive feedback to become more accurate over time. Alternatively, or additionally, the model may utilize inputs provided to the model to learn continually, thereby using the inputs to make subsequent predictions or using the inputs within the subsequent predictions. The feedback or inputs may be automatically ingested by the model as it is deployed. For example, as the model is used to perform the described method, if a user modifies predictions that were made by the model, provides feedback regarding a prediction, or otherwise provides some indication that the predictions or selections made by the model may be incorrect, the model may ingest this feedback to refine the model.

On the other hand, as the model makes predictions in connection with performing the described steps, and no changes are made to the resulting prediction, the model may utilize this as feedback to further refine the model. This may be referred to as reinforcement training where a prediction that was made by the model is reinforced as the correct prediction. Training the model may be performed in one of any number of ways including, but not limited to, supervised learning, unsupervised learning, semi-supervised learning, training/validation/testing learning, and/or the like.

The feedback or inputs could be stored within a data store and utilized at a later time to train or retrain the model. For example, a user could use the feedback to update a training dataset to train or retrain the model. The feedback or inputs could also be stored within the data store and then be used by the model for updated training. This may be done, for example, in an unsupervised learning session that allows the model to learn patterns and information regarding the training dataset without the need for human supervision, thereby providing at least a partially automated technique for the model to become updated. However, the model may or may not perform this retraining without a human providing input to the model to perform the retraining. In other words, retraining of the model may be based upon how the model is programmed and whether the model is updated while it is deployed or is only updated during a training mode may be based upon that programming.

As previously mentioned, an ensemble of models or multiple models may also be utilized. Some example models that may be utilized are variational autoencoders, generative adversarial networks, recurrent neural networks, convolutional neural networks, deep neural networks, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The tamper detection system may include different components for carrying out different functions of the system, including different steps to be performed. These components may be hardware components or software components. Some hardware devices or components that may be utilized by the tamper detection system include input devices that may be utilized to receive input from the user, for example, mechanical input modalities (e.g., keyboard, mouse, etc.), touch input devices, gesture input devices, electromyography input devices, audio input devices, and/or the like. Other hardware components may be utilized to provide output from the tamper detection system. For example, the tamper detection system may include speakers, displays or monitors, haptic output devices, audio output devices, and/or the like. Other hardware components may be included to capture images, for example, an image capture device, screen capture devices, and/or the like. Other hardware components may include data storage devices, including on devices of the user (e.g., mobile device, personal computer, laptop, tablet, smart watch, etc.), devices or components of the tamper detection system, and/or the like.

One software component may include a data storage location or data repository that stores information related to machine-readable captures, tape and information contained on the tape, metadata associated with the machine-readable captures or tape, actions to be performed, information associated with an entity or company utilizing the system, profiles, and/or the like. Information may be stored in the data storage location using any data storage technique. Additionally, the system can access the information stored within the data storage location using any type of querying technique, filtering technique, and/or the like. The information contained within the data storage location may also be organized, for example, grouped by image, grouped by user, grouped by component type, and/or the like.

Another software component includes a profile that stores information related to machine-readable captures, packages, actions to be performed based upon comparison results, and/or the like. The tamper detection system may utilize information contained within the profiles to perform the steps of the system. Thus, the profiles may include information that can be used by the tamper detection system for performing these steps. This information may be identified by the user through manual input, or identified by the tamper detection system as changes are made. In other words, information within the profiles may be learned by the tamper detection system over time. Thus, the tamper detection system can monitor inputs provided by a user, by an entity, by a system, and/or the like.

Accordingly, any of the mentioned profiles, or other profiles, may include additional information that may be useful for the tamper detection system and may be entered by a user, may be default values, may be learned by the system over time, and/or the like. Thus, profiles can be populated with information manually by a user, entities or companies, and/or the like, or can be populated over time as the system learns more about the user, entities or companies, actions, and/or the like. For example, a user may manually provide input to a profile and the system can learn preferences over time and populate the profile with this learned information.

Learned information may be information learned based upon direct inputs, for example, a user may be presented with a pop-up window in response to a trigger and provide input to the pop-up window. This input can be then populated into the profile. Learned information may also be information learned based upon indirect inputs, for example, a user may provide inputs (e.g., audible inputs, visual inputs, gesture inputs, etc.) that indicate that the user would like to perform a comparison of captures, perform a particular action in connection with a comparison result, and/or the like. The system can then aggregate this information to learn preferences for the profile.

At 301, the tamper detection system receives a machine-readable capture of tape located on a package. The tape includes at least one block of machine-recognizable characters. The tape can use any machine-readable format including, but not limited to, a bar code, a quick-read (QR) code, a proprietary code, and/or the like. The machine-readable capture can be any type of machine-readable capture including, but not limited to, a scan, an image capture, and/or the like. Additionally, capturing the machine-readable capture can be performed using any type of device or component that can perform the capture, for example, a handheld scanner, a barcode scanner, a quick-read (QR) code scanner, an image capture device, a scanner included in a machine that a package can pass through, and/or the like. For ease of readability, the machine-readable capture example that will be used here throughout will be a scan captured with a handheld scanner. However, this is not intended to limit this disclosure.

Reading or analyzing the machine-readable capture may be performed using any type of technique that can be utilized for analyzing the machine-recognizable characters captured in the machine-readable capture. Example reading or analysis techniques include, but are not limited to, artificial intelligence models, image analysis techniques, text analysis techniques, character analysis techniques, comparison techniques, rules engines, and/or the like. The reading or analysis technique that is chosen may be based upon the type of machine-recognizable characters that are being captured with the scan. For example, if the machine-recognizable characters include letters, the analysis technique may include a text analysis technique. It should be noted that a combination of reading and/or analysis techniques may be utilized to identify the machine-recognizable characters.

The tape is located on a package. The package may include a product that is included in packaging materials or may include a product itself. For packaging materials, the tape may be securing the package or packaging materials. In other words, the tape may be ensuring that the openings of the packaging materials are closed via the use of the tape. For example, the tape may be utilized to hold flaps of the packaging materials closed, the tape may be utilized to hold a bag closed, the tape may be utilized to secure a closure mechanism to prevent it from being opened without damaging the tape, and/or the like.

For tape that is utilized on the product itself, the tape may be used as an authentication mechanism for the product. In other words, the tape located on the package includes tape authenticating the package. Thus, the tape may be installed on the product in a manner suitable for the authentication. As an example, the tape could be installed on a location of a product that will not be visible when the product is in use, the tape could be installed on a location of a product that makes authentication easy, the tape could be installed to cover a portion of the product that may be sensitive to transportation and may be removed by an end user, and/or the like. As an example, if the product is a replacement component for a device, the tape could be located so that when the replacement component is installed in the device, the tape is no longer visible. As another example, if the product is a stand alone product, the tape may be located so that it can be viewed or accessed by an end user or other user easily in the case that the authenticity of the product needs to be verified. As a final, non-limiting example, if the product has connectors or other components that are sensitive or could be easily damaged during transportation, the tape may cover these connectors or other components to help protect them during transportation and an end user could remove the tape when the product is to be utilized.

It should be noted that the tape utilized or located on the package (either packaging materials or the product itself) does not have to be a continuous piece of tape, nor does each opening have to be covered by only a single piece of tape. In other words, the system is able to account for tape from different tape units (e.g., rolls, sheets, etc.). There is no requirement that only tape from a single tape unit be used for all tape located on a package. There is no requirement that each opening be secured by only a single piece of tape or tape from a single tape unit. There is no requirement that the tape be placed onto a package in a particular order or sequence.

The tape located on the package includes at least two blocks of machine-recognizable characters that proceed down the tape length. Other blocks of machine-readable characters may exist only partially be covered by other pieces of tape, or be invisible due to being on other sides of the package. Character blocks not seen or that are found to be invalid may be ignored. The blocks of machine-recognizable characters may be printed on the tape, manufactured as a layer of the tape, and/or any other technique to couple the blocks of characters to the tape. The tape may also have other anti-tamper mechanism. In other words, the use of the machine-recognizable characters on the tape can be used by itself or can be used in conjunction with other anti-tamper mechanisms. For example, the tape may include a hologram, controlled positioning of an anti-tamper graphic, and/or the like, in conjunction with the inclusion of the blocks of machine-recognizable characters. Thus, the tape can work in parallel with other anti-tamper mechanisms or can be incorporated into another anti-tamper mechanism.

Each block of machine-recognizable characters may include a set or series of characters. The machine-recognizable characters may include any characters that can be read by or analyzed by a computer or processing unit, for example, letters, numbers, symbols, images, shapes, designs, and/or the like. The number of characters included in each block can vary and may be based upon the application, preferences of a user or entity as identified from a profile, manually set by a user or entity, may be learned over time, may be selected based upon requirements of the tape, and/or the like. The sequence of blocks of machine-recognizable characters that are included on a tape unit are unique from other of the blocks of machine-recognizable characters that are included on the tape unit. In other words, each sequence of character blocks is different from any other sequence of character blocks. Thus, blocks of machine-recognizable characters on a length of the tape are unique as compared to other blocks of machine-recognizable characters on the length of the tape.

The machine-recognizable characters can be in any machine-readable format including, but not limited to, a bar code, a quick-read (QR) code, a proprietary code, and/or the like. The machine-recognizable characters can be generated using at least one cryptographic technique. The cryptographic technique that is utilized can be any cryptography method for performing reproducible no-collision hashes. Some example techniques include, but are not limited to, infinite hash calculations, elliptic curve cryptosystems-based functions, secure pseudo random functions, Boneh-Lynn-Shacham (BLS) signatures, and/or the like. The cryptographic technique can be provided with a seed to begin the creation of the cryptographic computation. The result of the cryptographic technique is a signature of an infinite length, or very long length. The minimum length is the entirety of a tape unit. Since each tape unit may have hundreds of thousands of blocks, and many millions of tape units may exist over time, a practical signature length may be more than $10^{10}$ blocks. Using some cryptographic techniques, multiple signatures are created to create different signatures for different tape units.

The block of machine-recognizable characters is a portion of the tape unit signature. Each block may include a predetermined number of machine-recognizable characters. The number of characters in each block can be a default number, user defined, learned by the system over time, based upon a width or length of the tape unit, and/or the like, as long as a sufficient number of bits of unique information is contained in each block. Utilizing a cryptographic technique to create the blocks of machine-recognizable characters means that the tenets or properties of the cryptographic technique are also inherited by the tape. The properties of the cryptographic techniques that may be utilized to generate the blocks of machine-recognizable characters on the tape unit include that the blocks of characters are not repeatable, not guessable, not derivable from a different block of characters, and not predictable. Cryptographic techniques can be utilized that have additional properties. The properties are then inherited by the tape. Thus, no block of machine-recognizable characters on the tape unit would be the same as any other block of machine-recognizable characters, would be guessable, would be derivable from a different block of characters, and is not predictable. Accordingly, sections of the tape cannot be forged because forgers do not have the cryptographical secrets needed to generate a valid block sequence. The blocks of characters may span the entire extent of the tape so that all extents of tape can be validated.

At 302, the tamper detection system determines if the machine-readable characters of the scan captured at 301 are legitimate ones from the supplier of the package. If they are not legitimate (no from block 302), the process terminates with an action to inform a user of the mismatch. Additionally, the system may invalidate the package at 310, which is described in more detail further herein.

If, on the other hand, the system determines that the machine-readable characters of the scan captured at 301 are legitimate (yes from block 302), at 303, an action is performed to move the package along in the logistics cycle. In other words, the package is moved, changes hands, shipped to a different location, or otherwise moved along the chain of custody. The new custodian acquires a new image capture of the package and its tape. This capture is processed in the same manner as the initial capture at 301 for its tape information to be extracted.

At 304, the tamper detection system matches information of a capture captured at 303 to the information of a previously captured machine-readable capture or scan. To make this determination, the tamper detection system compares the block(s) of machine-recognizable characters captured during the scan captured at 303 to information initially captured at 301. In situations with multiple changes of custody, the scan data from 303 may be compared to scan data during any previously captured machine-readable capture of the package from 303. A previously captured machine-readable capture of the package may be a scan that was captured at an origin location of the package or one captured at an intermediate location of the package. Each scan is added to the data repository and associated with the package. Other information can also be captured with the scan. For example, a location where the scan was captured, when the scan was captured, who captured the scan, the device that was used to capture the scan, and/or the like. This information may be associated with the scan within the data repository, for example, through adding the additional information as metadata to the scan information.

Alternatively, or additionally, the previously captured machine-readable capture and any other captured information could be accessible via a label that is attached to the package instead of accessing a particular data repository. The label can include the capture and other associated information, a link to a location of the capture and other associated information, and/or the like. In order to ensure that an actor does not counterfeit the label, the format of the label may only be readable using a particular type of component or device, using a specific program or application, and/or the like. Such a label may also be cryptographically protected for source authentication. Thus, using this technique, the label information may only be useful if a predetermined criteria is met or used (e.g., predetermined program, predetermined application, predetermined component, etc.). Thus, without the predetermined criteria, scanning the label will result in a return of nonsensical or rejectable information.

It should be noted that a previously captured scan can be taken at any point during the transportation process. Thus, each package may have multiple previously captured scans associated with it. For example, a package may be scanned at an origin location, at an intermediate destination, and at a final destination. Other locations where the package might be scanned include, but are not limited to, when the package is provided to a transporter, when the package is put into storage, after the package has been in storage for a predetermined period of time, and/or the like. Each of these scans can be associated with the package. In the event that a label having the information is utilized, the label can be updated if needed based upon each scan.

When scanning the package, there is no requirement that the tape be scanned in a particular order or sequence. The processing order of character blocks is determined by their procession down the tape length. The validation algorithm can check both directions of the tape against valid block sequences. Optionally, the encoding format of the data block might indicate the direction of processing. For example, blocks might be processed always in the upwards direction of the characters. As another example, processing direction keys may be encoded alongside each block data. Additionally, there is no requirement that, if the package includes multiple pieces of tape, that the different pieces of tape are scanned in a particular order or sequence. Although, such requirements could be added if desired. Thus, in such an implementation, the comparison may include comparing not only the blocks of characters captured at 303 with the blocks of characters captured in the previously-captured scan, but also comparing an order of the block of characters on the tape with the order of the blocks of characters captured in the previously-captured scan.

When comparing the blocks of characters captured at 303 with information from a previously captured scan, the system may also compare a location of a piece of tape on the package as identified in the scan with a location of a piece of tape on the package as identified in the previously captured scan. However, this is not strictly necessary, but could be used as an additional form of validation. Additionally, the comparison may include verifying any information contained within the metadata or information associated with the previously-captured scan matches predetermined information. The predetermined information may include a name of an expected origin location, an expected origin shipper, an expected origin time, an expected intermediate location, and/or the like. For example, the information associated with the previously-captured scan may include an origin location.

When the comparison is performed at 302, the tamper proofing system may identify the origin location. This origin can be provided in-band as part of the tape data blocks, out-of-band inside the data system, manually at the point of first scan, automatically from another scanned page or sign, and/or the like. The tamper proofing system, at the point of origin, will determine that the origin location matches an authentic origin location or an expected origin location. If it does not, the package cannot be validated for alter stages of the tamper proofing system. Thus, the metadata or other information associated with the scan at 301 is utilized as an extra verification and begins a chain of custody.

The information that is captured with the scans that are taken of the package during the supply chain can be used to verify the authenticity of the package, validate a lack of tampering with the package, verify or establish a provenance of the package, and also track a chain of custody of the package. Thus, the tape enables the tamper detection system to verify the physical security of the package, verify that a package that has been received is the same package that was at an origin location, identify a supply chain of the package, and identify who may have a package at any particular time.

The comparison of the blocks of characters captured at 303 and the information included in the previously-captured scan(s) can be performed using any comparison techniques. For example, the comparison may be a simple one-to-one matching technique, may be a comparison performed using an artificial intelligence model, may be a comparison performed using a rules engine, may be a comparison using a similarity comparison, and/or the like. Thus, any technique for comparing strings of information with each other can be utilized and employed. Additionally, different comparison techniques can be utilized for different packages, entities, and/or the like, and/or combinations of comparison techniques can be utilized.

If the tamper detection system determines at 304 that the block of characters captured at 303 do not match the information of a previously captured machine-readable capture (no branch from 304), the system may perform an action corresponding to a mismatch and/or inform a user of the mismatch at 310. The action that is performed can vary based upon the package, the type of mismatch, preferences identified in a profile, and/or the like. Additionally, the action that is performed can be selected based upon default settings, actions identified in a profile, learned by the system over time, an output from an artificial intelligence model, an output from another analysis model (e.g., rules engine, action tags, etc.), and/or the like. Some examples of actions that may be performed by the system include, but are not limited to, flagging a package within a system or graphical user interface, notifying a user of the mismatch (e.g., sending or pushing a communication to a user, providing a pop-up on a display device a user is utilizing, providing an alert on a scanner or other device being used to perform the scan, etc.), sending the package to a holding location, pulling the package from an automated verification system, and/or the like. Additionally, combinations of actions can be performed by the system.

In the case that a user is notified, the system could notify multiple users of the mismatch. The tamper detection system may also provide information related to the mismatch. The information related to the mismatch may include a portion of the package that is mismatched, an amount of the mismatch, a location on the package of the mismatch, and/or the like. Ultimately, the mismatch may result in the authentication of the package or validation of the physical security of the package being at least held until a user can verify the packaging or the authentication or validation may be denied completely. Any mismatch determination can be stored with the information associated with the package in the data repository. The system may also identify a potential source or location that resulted in the mismatch. In other words, the system could try to identify when the package was tampered with, if tampering is detected. This may be performed based upon the information that is associated with the package. For example, if the package had a previous scan that matched an origination scan, the system could identify that any tampering had to occur after the previous scan. Thus, the system could perform some analysis to attempt to determine information about the tampering to provide to a user or entity.

It should be readily understood that packages can be damaged during a supply chain irrespective of a bad actor. In the case of tape, a piece of tape could be folded under, scrapped, bunched, and/or the like. Thus, a scan of such tape would result in a mismatch between the scan at 303 and a previously captured scan. However, this may not be the result of the package being swapped or opened. The described system and method can account for block discontinuity, meaning that a few blocks of the tape are unreadable. Most pieces, if not all pieces, of tape would include more than one block of characters. Since the system is able to verify any length sequence of blocks of characters, it can also verify sequences that have gaps or errors. Using a sequence of blocks of characters instead of a sequence of characters, allows the tape to have error resistance that accounts for a situation when some of the numbers cannot be read.

Thus, the tamper detection system may either treat block discontinuity as a mismatch or could identify that block discontinuities of less than a particular length could be treated as a match. Since the validation routine only requires two blocks to validate, as long as any two contiguous blocks are intact, the tape image can be validated regardless of damage. Whether larger discontinuities are treated as mismatches or matches is a probabilistic determination dependent on the chosen cryptographic generation algorithm. A well-chosen block generation algorithm may have effectively a 100% tolerance for single missing blocks in a three or more-block chain. The tolerance level for less effective algorithms may be determined by the system, may be a default setting, may be set within a profile, may be learned by the system over time, and/or the like. Additionally, character discontinuities that are treated as mismatches could have a different action as compared to other mismatches. For example, character discontinuities may cause the system to flag the package as having a character discontinuity whereas packages with other mismatches may send a notification to a user and may also flag the package. On the other hand, character discontinuities could be treated the same as another mismatch.

If, on the other hand, the tamper detection system determines at 304 that the block of characters captured at 303 does match the information of a previously captured machine-readable capture (yes branch from 304), the system may perform an action corresponding to a match and/or validate the package at 305. Performing the action in response to a match between the information contained within the scan received at 303 and the information of the previously captured scan may include authenticating the package and/or validating the physical security of the package. In other words, a match can be reflective of the fact that the package has not been tampered with. Accordingly, the action may correspond a determination of no tampering of the package. As with mismatches, the actions that are performed can be selected using a variety of techniques. The matching result can also be stored with the information associated with the package in the data repository for access and/or comparison later.

After validation of no tampering at 305, the package might undergo additional changes of owner, undertake further shipment, be moved locally, and/or the like, at 320. At each new destination, the capture and validation steps from 303 to 305 may be performed again in the same manner. The repetition of 320 ends when the package reaches its final destination and is opened.

Figure 4:
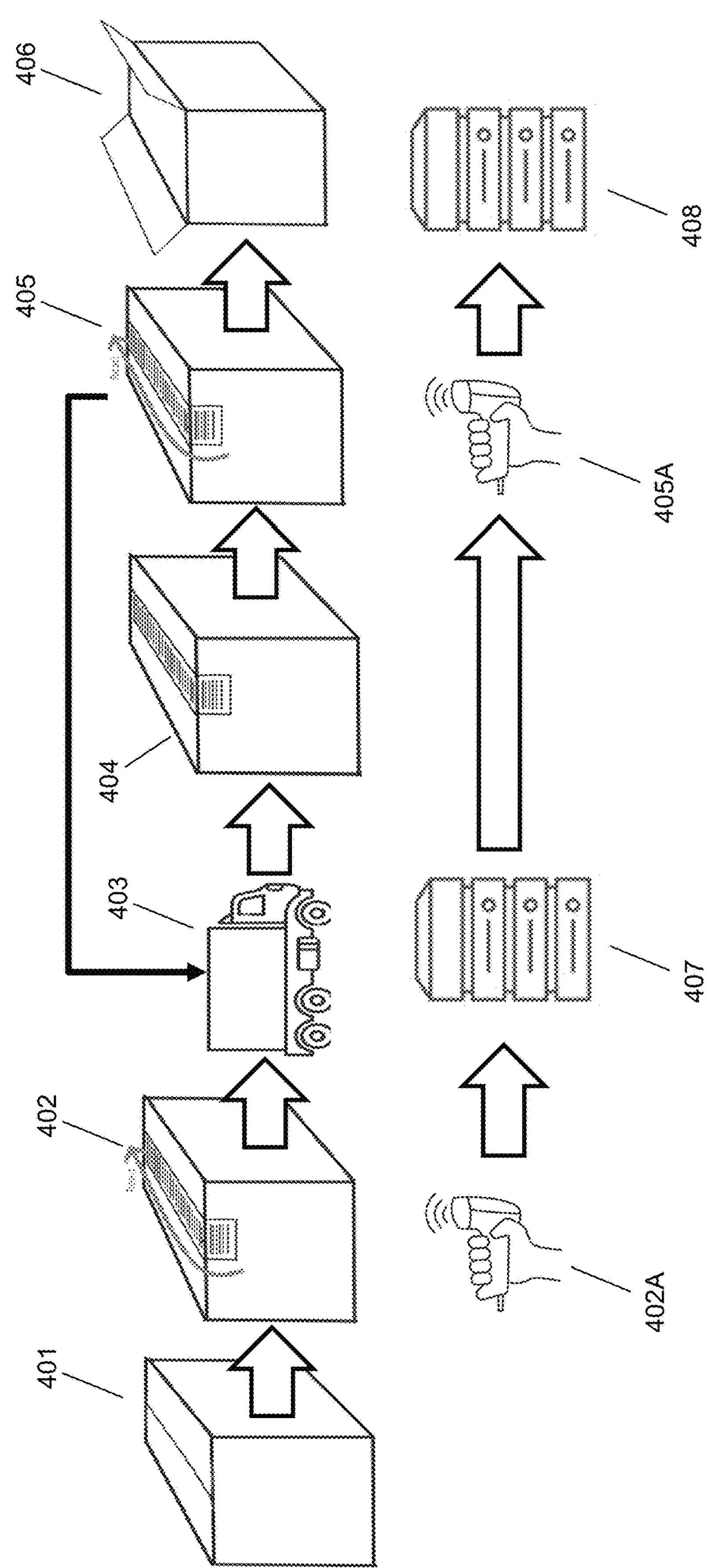
FIG. 4 illustrates an example supply chain for a package where machine-readable captures of unique tape are captured and compared for package validation.

FIG. 4 illustrates an example supply chain for a package where machine-readable captures of unique tape are captured and compared for package validation. This description in connection with FIG. 4 is an overall, non-limiting example of the described system. Thus, other steps may be undertaken, steps may be removed, the steps may be performed in a different order, the steps may be performed in connection with a different type of package, and/or the like. For example, FIG. 4 is described in connection with the tape being included to secure packaging materials of a package. However, a similar process can be undertaken to validate an authenticity of a package where the tape is being used as an authentication device.

At 401, the tape is placed on a box during the packaging of the product. The tape is placed to cover openings of the box. In other words, the tape is placed to secure the packaging materials of the package. However, this is not strictly necessary. While the tape may be placed to close openings of the package, the tape may also be placed on other locations on the package. At 402, a user performs a machine-readable capture or scan 402A of the tape. The package is then placed on a transportation vehicle 403 for transport to a location. The information that was captured from the scan 402A is transmitted to a data storage location 407. In transmitting the information, the information may be combined with any metadata or other information that is captured at the time of the scan 402A, for example, information related to who performed the scan, when the scan was performed, where the scan was performed, information related to an entity shipping the package, and/or the like. When transmitting the information, the information may be transmitted separately from the package. Alternatively, the information could be transmitted with the package, for example, via a label that is attached to the package that links to a data storage location of the information.

When the package reaches a destination, an intake system, which could be a manual intake system or an automated intake system, inspects the tape for physical tampering at 404. A user also takes a machine-readable capture or scan 405A of the package at 405. The information of this scan can be compared at 408 to the information of the original scan 402A contained within the data repository. Based upon this comparison, different actions can be taken. Assuming that the comparison indicates that the package has not been tampered with and/or that the package is authentic, the package could be placed back into the transportation portion of the system 403 to be transported to a different location or could be unboxed 406. If the package is validated as authentic and/or not tampered with, the validation can be added to the data repository. In the event that the system determines that the packaging has been tampered with or that the package is not authentic, different actions can be taken, as previously discussed.

It will be readily understood that the components of the embodiments, as generally described and illustrated in the figures herein, may be arranged and designed in a wide variety of different configurations in addition to the described example embodiments. Thus, the more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:

receiving, at a tamper detection system, a machine-readable capture of a tape located on a package, wherein the tape comprises at least two blocks of machine-recognizable characters, the blocks being generated utilizing at least one cryptographic technique, wherein the at least one cryptographic technique is used to generate a non-repeating signature having a length greater than a physical length of the tape;

comparing, using the tamper detection system, at least one of the blocks of machine-recognizable characters captured during the machine-readable capture of the tape on the package to the non-repeating signature to determine whether the at least one block corresponds to a valid portion of the non-repeating signature; and performing, using the tamper detection system, an action based upon a result of the comparing.

2. The method of claim 1, wherein the tape located on the package comprises tape securing the package closures.

3. The method of claim 2, wherein the result comprises a match between the machine-readable capture and a previously captured machine-readable capture.

4. The method of claim 2, wherein the result comprises a mismatch between the machine-readable capture and the previously captured machine-readable capture and wherein the performing the action comprises notifying a user of the mismatch.

5. The method of claim 1, wherein the previously captured machine-readable capture is associated with metadata captured at a time of the previously captured machine-readable capture and wherein the comparing comprises verifying information contained within the metadata matches predetermined information.

6. The method of claim 5, wherein the previously captured machine-readable capture and the metadata are accessible via a label attached to the package.

7. The method of claim 1, wherein the tape located on the package comprises tape authenticating the package.

8. The method of claim 1, wherein the tape located on the package comprises a plurality of sections of tape, the plurality of sections of tape comprising a plurality of signature blocks, and wherein the comparing comprises comparing the plurality of sections of tape.

9. The method of claim 1, wherein the receiving the machine-readable capture comprises identifying a location of the tape on the package and wherein the comparing the machine-readable capture comprises verifying the location of the tape on the package matches a location of the tape on the package during the previously captured machine-readable capture.

10. The method of claim 1, wherein a sequence of the blocks on the tape has a secondary asymmetric cryptography applied.

11. A system, the system comprising:

a processor;

a memory device that stores instructions that, when executed by the processor, causes the system to:

receive, at a tamper detection system, a machine-readable capture of a tape located on a package, wherein the tape comprises at least two blocks of machine-recognizable characters, the blocks being generated utilizing at least one cryptographic technique, wherein the at least one cryptographic technique is used to generate a non-repeating signature having a length greater than a physical length of the tape;

compare, using the tamper detection system, at least one of the blocks of machine-recognizable characters captured during the machine-readable capture of the tape on the package to the non-repeating signature to determine whether the at least one block corresponds to a valid portion of the non-repeating signature; and perform, using the tamper detection system, an action based upon a result of the comparing.

12. The system of claim 11, wherein the tape located on the package comprises tape securing the package closures and wherein the result comprises a match between the machine-readable capture and a previously captured machine-readable capture.

13. The system of claim 11, wherein the tape located on the package comprises tape securing the package closures and wherein the result comprises a mismatch between the machine-readable capture and the previously captured machine-readable capture and wherein the performing the action comprises notifying a user of the mismatch.

14. The system of claim 11, wherein the previously captured machine-readable capture is associated with metadata captured at a time of the previously captured machine-readable capture and wherein the comparing comprises verifying information contained within the metadata matches predetermined information.

15. The system of claim 14, wherein the previously captured machine-readable capture and the metadata are accessible via a label attached to the package.

16. The system of claim 11, wherein the tape located on the package comprises tape authenticating the package.

17. The system of claim 11, wherein the tape located on the package comprises a plurality of sections of tape, the plurality of sections of tape comprising a plurality of signature blocks, and wherein the comparing comprises comparing the plurality of sections of tape.

18. The system of claim 11, wherein the receiving the machine-readable capture comprises identifying a location of the tape on the package and wherein the comparing the machine-readable capture comprises verifying the location of the tape on the package matches a location of the tape on the package during the previously captured machine-readable capture.

19. The system of claim 11, wherein a sequence of the blocks on the tape has a secondary asymmetric cryptography applied.

20. A product, the product comprising:

a computer-readable storage device that stores executable code that, when executed by a processor, causes the product to:

receive, at a tamper detection system, a machine-readable capture of a tape located on a package, wherein the tape comprises at least two blocks of machine-recognizable characters, the blocks being generated utilizing at least one cryptographic technique, wherein the at least one cryptographic technique is used to generate a non-repeating signature having a length greater than a physical length of the tape;

compare, using the tamper detection system, at least of the one blocks of machine-recognizable characters captured during the machine-readable capture of the tape on the package to the non-repeating signature to determine whether the at least one block corresponds to a valid portion of the non-repeating signature; and perform, using the tamper detection system, an action based upon a result of the comparing.

* * * * *